Patented Nov. 4, 1930

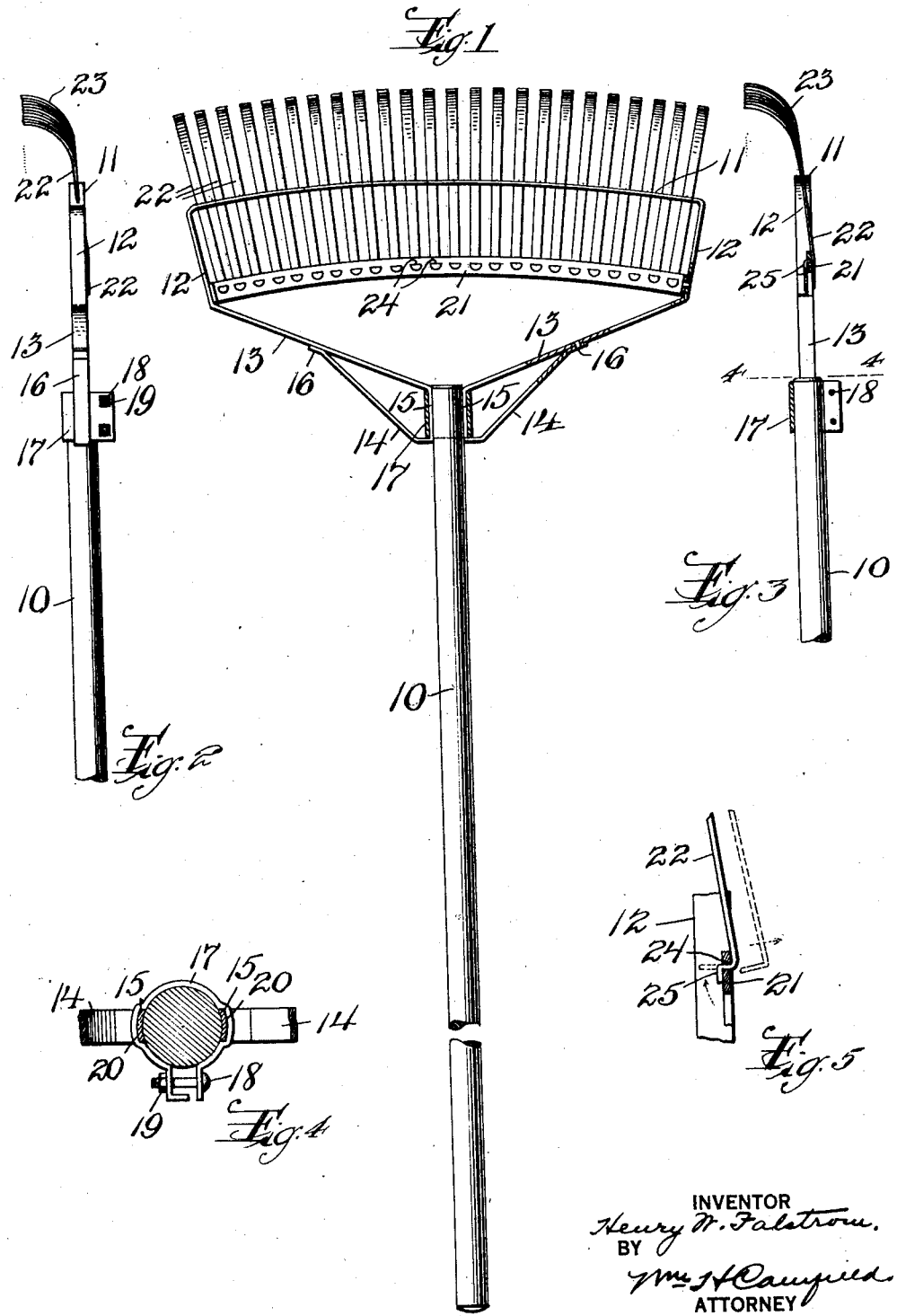

1,780,180

UNITED STATES PATENT OFFICE

HENRY W. FALSTROM, OF BLOOMFIELD, NEW JERSEY, ASSIGNOR TO EASTERN TOOL & MANUFACTURING COMPANY, OF BLOOMFIELD, NEW JERSEY

RAKE

Application filed December 15, 1927. Serial No. 240,163.

This invention relates to an improved rake and particularly to a rake used for gathering cut grass and other light material from lawns and the like, being sturdy enough to gather such light material but being flexible enough to cause the tines to give way when engaging solid substances so that the roots and the blades of grass that are still in the ground are not damaged. The rake, except for the handle and the ferrule that holds it to the handle, is made of flat strips of metal, in the preferred form, and the tines are also preferably made of flat stiff material although I do not wish to limit myself to this exact form of strip.

Another object of the invention is to provide a rake which is cheap to make and can be quickly assembled and it is easily repaired, particularly when tines become broken as an old tine can be removed and a new tine put in by anyone, due to the simple construction of the rake.

The invention is illustrated in the accompanying drawings in which Figure 1 is a bottom view of a rake with the parts of the frame shown in section. Figure 2 is a side view of the rake shown in Figure 1 and Figure 3 is a central vertical section of the rake shown in Figure 1. Figure 4 is an enlarged section on line 4—4 in Figure 3. Figure 5 is a detailed section showing the manner of securing a tine to the frame.

In the drawing I show an ordinary handle 10 on the end of which the frame is secured. The frame consists of a flat strip of sheet metal which is bent to form a front bar 11 and then is extended rearwardly on each end to form the side bars 12 and at the rear ends of these side bars the strip is bent so that the rearwardly and inwardly extending braces 13 are provided. These are then continued in the form of return bends 14, the flat inner ends 15 of which are utilized to secure the device to the handle and the outer ends 16 are riveted or welded to the braces 13.

To fasten the frame to the handle I provide a split ferrule 17 with means such as the screws 18 and the nut 19 for drawing it tightly around the handle and I also provide recesses or grooves 20 which are as deep as the flat parts 15 of the frame and are as long as these flat parts so that when they are clamped as shown in Figure 2, 3 and 4 the frame and the handle are securely connected. The frame is provided with a rear bar 21 that is substantially parallel with the front bar 11 and these bars are usually made arc shaped so as to provide a curved support for the tines. This arrangement is also of advantage in that the front ends of the tines at the extreme sides of the rake project laterally beyond the frame so that the rake can be used in corners with advantage. The tines 22 are usually of flat spring metal with curved parts 23 and with the straight parts passing through slits in the front bar 11 and then through slits 24 in the rear bar 21. The rear bar 21 is in a plane at right angles to the front bar 11 so that the tines are perpendicular to the front bar or nearly so and lie flat against the rear bar and are bent to pass through the slits 24 and then bent again as at 25 to securely hold the tines in place. The slits in the rear bar are spaced apart a less distance than those in the front bar so that a set of tines is fan-shaped or radial so that the tines extend slightly beyond the sides of the frame to give the rake a greater spread than the spread of the frame.

The device is economical to make because the tines are all alike and can be easily inserted in the frame and, furthermore, the rake can be easily repaired. This is due to the fact that a broken tine can be removed as shown in Figure 5, the end 25 being bent up by any ordinary tool or blade and then the tine can be swung out of the slit 24 as shown in dotted outline and then by pulling it forward to the front bar and turning it slightly it can be entirely removed from the frame. By the reversal of these steps a new tine can be inserted.

Various modifications can be made in the form of the parts without departing from the scope of the invention.

I claim :—

1. A rake comprising a frame formed of a flat strip bent so as to provide a front bar with converging rearwardly extending side bars and which connect with inwardly extending braces which are provided with return bends with the ends of the strip secured to the braces, a rear bar connected to the side bars in rear of the front bar, and tines passing through slits in the front bar and the rear bar and with their rear ends bent over on the rear bar to hold the tines in place and providing a ready releasing means for a broken tine.

2. A rake comprising a frame formed of a flat strip bent so as to provide a front bar with converging rearwardly extending braces which are provided with return bends with the ends of the strip secured to the braces, a rear bar connected to the side bars in rear of the front bar, and flexible flat tines passing through the front bar and through the rear bar and arranged in radial relation, the rear ends of the tines being off-set where they engage the rear bar.

3. A rake comprising a frame formed of a flat strip, the frame comprising an arc-shaped front bar, side bars and converging rearwardly extending braces terminating in return bends with their ends secured, a split ferrule with recesses to receive the return bends, means for clamping the ferrule and the said received return bends around a handle, an arc-shaped rear bar secured to the side bars in rear of the front bar and in a plane at right angles to the plane of the front bar, slits in the rear bar and the front bar and spaced farther apart in the front bar, and flat flexible tines in the slits and bent through and then over where their rear ends pass through the slits in the rear bar.

In testimony whereof I affix my signature.

HENRY W. FALSTROM.